(12) United States Patent
Nakagawa et al.

(10) Patent No.: US 10,753,427 B2
(45) Date of Patent: Aug. 25, 2020

(54) ROTARY ACTUATOR PROVIDED WITH STRAIN WAVE REDUCTION GEARS

(71) Applicant: HARMONIC DRIVE SYSTEMS INC., Shinagawa-ku, Tokyo (JP)

(72) Inventors: Hiroshi Nakagawa, Azumino (JP); Daisuke Yaguchi, Azumino (JP)

(73) Assignee: HARMONIC DRIVE SYSTEMS INC., Shinagawa-Ku, Tokyo (JP)

( * ) Notice: Subject to any disclaimer, the term of this patent is extended or adjusted under 35 U.S.C. 154(b) by 198 days.

(21) Appl. No.: 16/091,203

(22) PCT Filed: May 11, 2016

(86) PCT No.: PCT/JP2016/064070
§ 371 (c)(1),
(2) Date: Oct. 4, 2018

(87) PCT Pub. No.: WO2017/195308
PCT Pub. Date: Nov. 16, 2017

(65) Prior Publication Data
US 2019/0113106 A1    Apr. 18, 2019

(51) Int. Cl.
*F16H 1/32* (2006.01)
*F16H 49/00* (2006.01)
*H02K 7/116* (2006.01)

(52) U.S. Cl.
CPC ............. *F16H 1/32* (2013.01); *F16H 49/001* (2013.01); *H02K 7/116* (2013.01)

(58) Field of Classification Search
CPC .......................... F16H 49/001; F16H 2049/003
See application file for complete search history.

(56) References Cited

U.S. PATENT DOCUMENTS

| 4,398,110 A * | 8/1983 | Flinchbaugh ......... B25J 9/1025 310/83 |
| 2002/0135241 A1* | 9/2002 | Kobayashi ............ H02K 7/083 310/20 |

(Continued)

FOREIGN PATENT DOCUMENTS

| JP | 63062934 A | 3/1988 |
| JP | 64021248 A | 1/1989 |

(Continued)

OTHER PUBLICATIONS

International Search Report (PCT/ISA/210) dated Aug. 2, 2016, by the Japanese Patent Office as the International Searching Authority for International Application No. PCT/JP2016/064070.

(Continued)

*Primary Examiner* — Terence Boes
(74) *Attorney, Agent, or Firm* — Buchanan Ingersoll & Rooney PC (57) ABSTRACT

A rotary actuator has: one motor, two strain wave reduction gears disposed symmetrically on both sides of the motor, and one output shaft. The output rotation of the motor is reduced in speed at the same reduction ratio by the two strain wave reduction gears and is outputted from the output shaft to a load side. The first and second externally toothed gears of the first and second strain wave reduction gears are flexed into ellipsoidal shapes with 90 degrees shifted in phase, and are meshed with first and second internally toothed gears. The angle transmission errors of the first and second strain wave reduction gears transmitted to the output shaft are reduced by cancelling each other out in the output shaft. Reduced-speed output rotation that has the reduced angle transmission errors is outputted to the load side from the output shaft.

7 Claims, 3 Drawing Sheets

(56) References Cited

U.S. PATENT DOCUMENTS

| | | | |
|---|---|---|---|
| 2007/0281824 A1* | 12/2007 | Tezuka | G01D 5/04 |
| | | | 475/331 |
| 2008/0098839 A1* | 5/2008 | Maruyama | H02K 7/116 |
| 2013/0333516 A1* | 12/2013 | Yeh | F16H 49/001 |
| | | | 74/640 |
| 2014/0033840 A1* | 2/2014 | Yokoyama | F16C 19/55 |
| | | | 74/63 |
| 2014/0283638 A1* | 9/2014 | Yajima | H02K 11/21 |
| | | | 74/412 R |
| 2019/0089224 A1* | 3/2019 | Hatani | F16H 57/025 |

FOREIGN PATENT DOCUMENTS

| | | |
|---|---|---|
| JP | 10311385 A | 11/1998 |
| JP | 2007321879 A | 12/2007 |
| JP | 4833028 B2 | 12/2011 |
| JP | 2013015191 A | 1/2013 |

OTHER PUBLICATIONS

Written Opinion (PCT/ISA/237) dated Aug. 2, 2016, by the Japanese Patent Office as the International Searching Authority for International Application No. PCT/JP2016/064070.

* cited by examiner

ROTARY ACTUATOR PROVIDED WITH STRAIN WAVE REDUCTION GEARS

TECHNICAL FIELD

The present invention relates to a rotary actuator provided with two strain wave reduction gears that are driven by one motor.

BACKGROUND ART

A rotary actuator employing a strain wave reduction gear is generally constituted by one motor and one strain wave reduction gear as have been proposed in Patent documents 1 and 2. A reduction gear unit disclosed in Patent document 1 has a structure in which one motor and one cup-type strain wave reduction gear are linked in tandem. An actuator disclosed in Patent document 2 has a structure in which one motor and one silk hat-type strain wave reduction gear are linked in tandem.

On the other hand, an actuator, which is provided with two cup-type or silk-hat-type strain wave gearing devices driven by one motor, has been proposed in Patent document 3. This actuator is provided with two output shafts and is capable of outputting reduced-speed rotations that are reduced at different reduction ratios from the respective output shafts.

PRIOR ART DOCUMENTS

Patent Documents

Patent document 1: JP 2007-321879 A
Patent document 2: JP 4833028 B
Patent document 3: JP 10-311385 A

SUMMARY OF THE INVENTION

Problems to be Solved by the Invention

A strain wave reduction gear employed in these actuators has a flexible externally toothed gear that is generally flexed into an ellipsoidal shape by a wave generator and is meshed with a rigid internally toothed gear at two positions in the circumferential direction. When the wave generator is rotated by a motor, the meshing positions between the two gears move in the circumferential direction and a relative rotation between the two gears is generated according to a difference in number of teeth between them each time when the wave generator rotates once. In the externally toothed gear flexed into an ellipsoidal shape, each portion in the circumferential direction thereof is repeatedly flexed radially with a fixed amplitude in accordance with rotation of the wave generator. Such strain wave motion occurred in the externally toothed gear is a vibration having two cycles per one rotation of the wave generator.

In a strain wave reduction gear, processing errors in the tooth part of both gears, misalignment between the wave generator and the both gears, assembly errors including inclination et al cause to occur angle transmission errors. In a case of a strain wave reduction gear in which an externally toothed gear is flexed into an ellipsoidal shape, vibration components expressing the angle transmission errors include one with two cycles per one rotation of a wave generator, which is a secondary vibration component and is larger than vibration components of other orders. Such vibration component can cause resonance with a device in which a strain wave reduction gear is assembled, which causes positioning failure in a drive system such as a transport system et al. In addition, in a case in which a motion locus with high accuracy is required, due to such vibration component, such accuracy as satisfying the required level cannot be realized.

An object of the present invention is to provide a rotary actuator provided with a strain wave reduction gear, which is able to suppress an angle-transmission-error component that occurs in two cycles per rotation of a wave generator.

Means of Solving the Problems

A rotary actuator provided with strain wave reduction gears of the present invention has one motor and two strain wave reduction gears which decelerate an output rotation of the motor at the same reduction ratio and output a reduced-speed rotation to a load side from one output shaft. In each of the strain wave reduction gears, a flexible externally toothed gear is flexed into an ellipsoidal shape by a wave generator and is meshed partially with a rigid internally toothed gear. The wave generator is a rotation input member to which the output rotation of the motor is inputted, one of the externally toothed gear and the internally toothed gear is a rotation output member from which a speed-reduced rotation is outputted to the output shaft, and the other of the externally toothed gear and the internally toothed gear is a fixed-side member which is fixed not to rotate. In addition, the ellipsoidal shape of the externally toothed gear of the one strain wave reduction gear is offset in phase by 90 degrees from the ellipsoidal shape of the externally toothed gear of the other strain wave reduction gear.

According to the rotary actuator of the present invention, the respective externally toothed gears of the strain wave reduction gears are flexed in a manner of 90° offset in phase with respect to each other. Thus, secondary vibration components included in angle transmission errors that occur in the respective strain wave reduction gears are opposite in phase with each other. Because the reduced-speed output rotations from the respective strain wave reduction gears are taking out to the load side via the same output shaft, the angle transmission errors transmitted to the output shaft from the respective strain wave reduction gears are synthesized at the output shaft. The secondary vibration components included in the respective angle transmission errors are opposite in phase, and therefore are synthesized and cancelled each other out when transmitted to the output shaft, whereby the synthesized amplitude of the vibration components is reduced. As a result, it is possible to reduce the angle transmission errors included in the output rotation taking out to the load side from the output shaft.

In addition, because the reduced-speed rotation is outputted via the one output shaft from the two strain wave reduction gears, it is possible to secure a large torque and realize a rotary actuator having high moment capacity and high rigidity.

In the present invention, in order to output the reduced-speed rotations from the two strain wave reduction gears, via the one output shaft, to the load side, the two strain wave reduction gears are arranged symmetrically in a manner sandwiching the hollow type motor between them and the one output shaft is disposed to pass through the hollow part of the motor, as mentioned below.

Specifically, in the rotary actuator of the present invention, the motor is provided with a hollow motor shaft defining a motor hollow part extending to pass therethrough in the direction of the center axis line. Here, the two strain wave reduction gears are referred to as first and second strain wave reduction gears; the wave generator, the externally toothed gear and the internally toothed gear of the first strain wave reduction gear are referred to as a first wave generator, a first externally toothed gear and a first internally toothed gear; and the wave generator, the externally toothed gear and the internally toothed gear of the second strain wave reduction gear are referred to as a second wave generator, a second externally toothed gear and a second internally toothed gear. The first strain wave reduction gear is arranged at one first side in the direction of the motor center axis line with respect to the motor, and the second strain wave reduction gear is arranged at the other second side in the direction of the motor center axis line in a manner symmetrical with respect to the first strain wave reduction gear. The output shaft extends to pass through the motor hollow part and has a first output-shaft end part projecting from the motor hollow part to the first side and a second output-shaft end part projecting from the motor hollow part to the second side. The first wave generator is linked coaxially to a one first motor-shaft end part of the hollow motor shaft and the second wave generator is linked coaxially to the other second motor-shaft end part of the hollow motor shaft. The rotation output member of the first strain wave reduction gear is linked to the first output-shaft end part so as to rotate integrally, and the rotation output member of the second strain wave reduction gear is linked to the second output-shaft end part so as to rotate integrally.

The wave generator of the strain wave reduction gear is generally provided with a rigid plug, a wave-generator bearing mounted between an elliptical outer circumferential surface of the plug and the externally toothed gear. In this case, the plugs of the both strain wave reduction gears are attached to the motor shaft so that the elliptical outer circumferential surfaces thereof are shifted 90° in phase around the center axis line with each other.

Specifically, in the rotary actuator of the present invention, the first wave generator is provided with a rigid first plug fixed coaxially to the first motor-shaft end part, and a first wave-generator bearing mounted between a first elliptical outer circumferential surface formed on the first plug and an inner circumferential surface of the first externally toothed gear. The second wave generator is provided with a rigid second plug fixed coaxially to the second motor-shaft end part, and a second wave-generator bearing mounted between a second elliptical outer circumferential surface formed on the second plug and an inner circumferential surface of the second externally toothed gear. The first elliptical outer circumferential surface and the second elliptical circumferential surface are of the same shape, and the first and second plug are fixed to the hollow motor shaft so that the first and second elliptical outer circumferential surfaces are shifted 90° in phase around the center axis line with each other.

The strain wave reduction gear is provided with a bearing for supporting the internally toothed gear and the externally toothed gear in a relatively rotatable manner. The output shaft are supported on both ends thereof by the bearings of the strain wave reduction gears arranged on both sides of the motor, whereby the rigidity of the rotary actuator can be increased.

Specifically, in the rotary actuator of the present invention, the first strain wave reduction gear is provided with a first bearing for supporting the first internally toothed gear and the first externally toothed gear in a relatively rotatable manner, and the second strain wave reduction gear is provided with a second bearing for supporting the second internally toothed gear and the second externally toothed gear in a relatively rotatable manner. The first output-shaft end part is supported by the first bearing, and the second output-shaft end part is supported by the second bearing.

In this case, the following structure can be adopted for the rotary actuator of the present invention. Specifically, the first and second plugs are hollow plug, and a first end plate is fixed to the first output-shaft end part projecting to the first side from the hollow part of the first plug. Here, a fixed-side member of the first strain wave reduction gear is referred to as a first fixed-side member; a fixed-side member of the second strain wave reduction gear is a second fixed-side member, an inner race and an outer race of the first bearing are a first inner race and a second outer race; and an inner race and an outer race of the second bearing are a second inner race and a second outer race. The first end plate is fixed to the first inner race, or instead the first end plate and the first inner race are formed by a single member. The first inner race is linked to the first rotation output member so as to rotate integrally, or instead the first inner race and the first rotation output member are formed by a single member. A second end plate is fixed to the second output-shaft end part projecting from the hollow part of the second plug to the second side. The second end plate is fixed to the second inner race, or instead the second end plate and the second inner race are formed by a single member. The second inner race is linked to the second rotation output member so as to rotate integrally, or instead the second inner race and the second rotation output member are formed from a single member.

In the present invention, a cup-type strain wave reduction gear, a silk-hat-type strain wave reduction gear or a flat-type strain wave reduction gear can be employed as the strain wave reduction gear.

MODE FOR CARRYING OUT THE INVENTION

Embodiments of a rotary actuator according to the present invention will be described hereinbelow with reference to the drawings.

Embodiment 1

Figure 1:
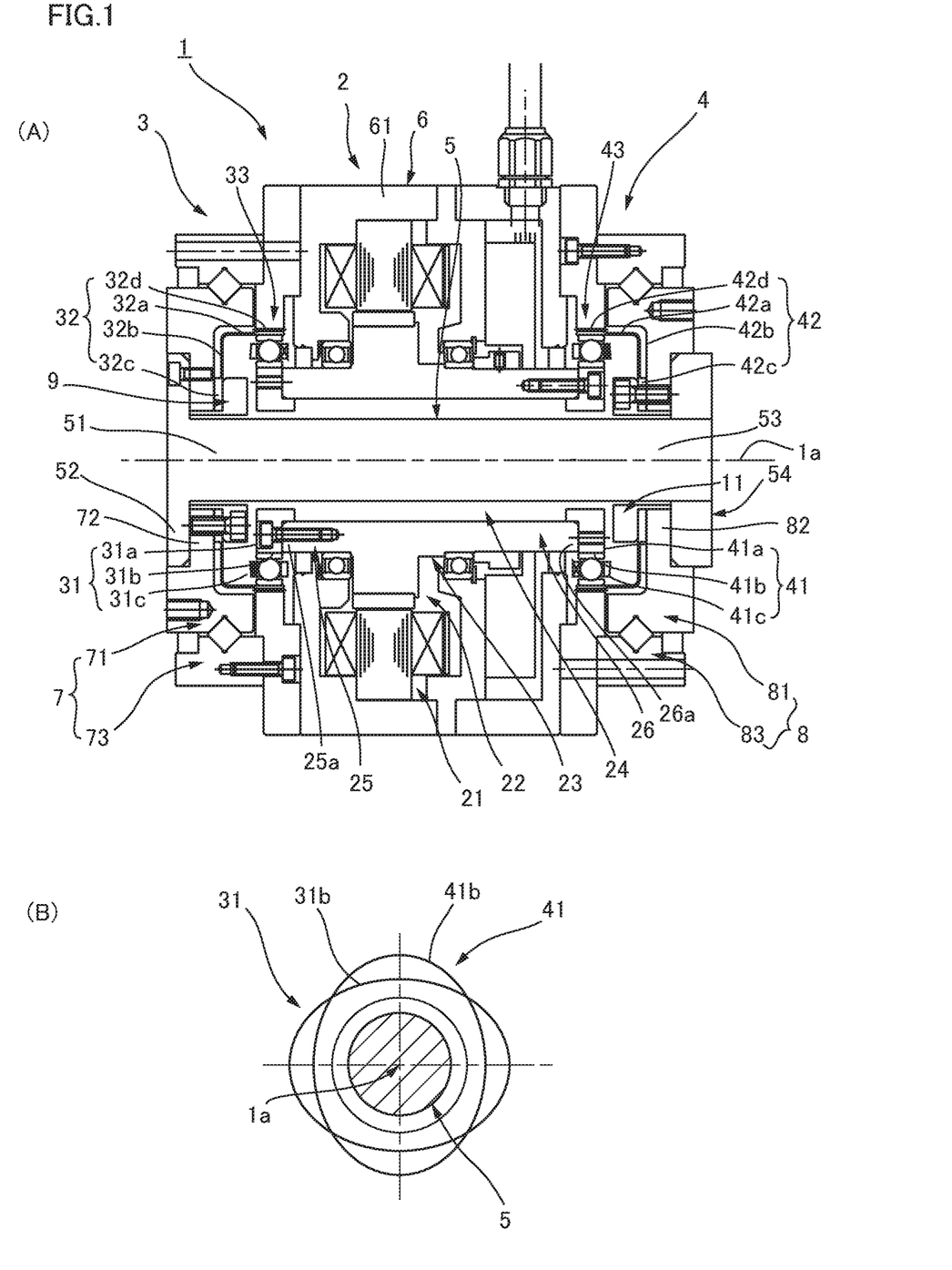
FIG. 1 includes schematic longitudinal cross-sectional view and a schematic view, illustrating a rotary actuator according to Embodiment 1 to which the present invention is applied.

FIG. 1(A) is a schematic longitudinal cross-sectional view illustrating a rotary actuator according to Embodiment 1. The rotary actuator 1 is provided with one hollow-type motor 2, cup-type first and second strain wave reduction gears 3 and 4, and one output shaft 5. The first and second strain wave reduction gears 3 and 4 are of the same structure having the same reduction ratio and are arranged symmetrically so as to sandwich the motor 2 therebetween in the direction of the center axis line 1a. The output shaft 5 is a member for taking out the reduced-speed rotation outputted from the first and second strain wave reduction gears 3 and 4 to a load side (not shown).

In the first strain wave reduction gear 3, a flexible first externally toothed gear 32 having a cup shape is flexed into an ellipsoidal shape by a first wave generator 31 and is partially meshed with a rigid first internally toothed gear 33. The first wave generator 31 is a rotation input member into which the output rotation of the motor 2 is inputted, and the first internally toothed gear 33 is a fixed-side member fixed to the side of a housing 6 so as not to rotate. The first externally toothed gear 32 is a rotation output member for outputting a reduced-speed rotation to the output shaft 5, and is supported via a first bearing which is a cross roller bearing 7 in this example in a free rotatable state with respect to the first internally toothed gear 33 (the housing 6 to which the first internally toothed gear 33 is fixed).

Similarly in the second strain wave reduction gear 4, a flexible second externally toothed gear 42 having a cup shape is flexed into an ellipsoidal shape by a second wave generator 41, and is partially meshed with a rigid second internally toothed gear 43. The second wave generator 41 is a rotation input member into which the output rotation of the motor 2 is inputted, and the second internally toothed gear 43 is a fixed-side member fixed to the side of the housing 6 so as not to rotate. The second externally toothed gear 42 is a rotation output member for outputting a reduced-speed rotation to the output shaft 5, and is supported via a second bearing which is a cross roller bearing 8 in this example in a free rotatable state with respect to the second internally toothed gear 43 (the housing 6 to which the second internally toothed gear 43 is fixed).

The respective parts of the rotary actuator 1 will be further described. In the following description, viewed along the center axis line 1a, the side of the first strain wave reduction gear 3 is referred to as the first side and the side of the second strain wave reduction gear 4 is as the second side.

The hollow-type motor 2 is provided with a stator 21 attached to the inner periphery of the cylinder part 61 of the housing 6, and a hollow rotor 22 arranged coaxially inside the stator. A hollow motor shaft 23 is integrally formed in the hollow rotor 22. A motor hollow part 24 is formed so as to extend to pass through the center part of the hollow motor shaft 23 in the direction of the center axis line 1a. The hollow motor shaft 23 is formed with a first hollow motor shaft part 25 extending to the first side from the hollow rotor 22 and a second hollow motor shaft part 26 extending to the second side from the hollow rotor.

The output shaft 5 extends to pass through the motor hollow part 24 in a state coaxially with the hollow motor shaft 23. The output shaft 5 has a first output-shaft end part 51 projecting toward the first side from the motor hollow part 24 at the side of the first hollow motor shaft part 25, and a large-diameter first output flange 52 is integrally formed in the first output-shaft end part 51. The output shaft 5 has a second output-shaft end part 53 projecting toward the second side from the motor hollow part 24 at the second hollow motor shaft part 26. A large-diameter annular second output flange 54 is attached to the second output-shaft end part 53.

In the first strain wave reduction gear 3, the first wave generator 31 is coaxially fixed to a first motor-shaft end part 25a which is a shaft end part at the side of the first hollow motor shaft part 25 of the hollow motor shaft 23. The first wave generator 31 is provided with a rigid first plug 31a coaxially fixed to the end face of the first motor-shaft end part 25a and a wave-generator bearing 31c mounted on the first ellipsoidal outer circumferential surface 31b that is formed on the outer circumferential surface of the first plug 31a.

The first externally toothed gear 32 having a cup shape is provided with a cylindrical body part 32a, a diaphragm 32b extending radially and inwardly from an end of the cylindrical body 32a at the first side, a rigid annular boss 32c formed on the inner peripheral edge of the diaphragm 32b, and external teeth 32d formed on the outer circumferential surface portion of the other end of the cylindrical body 32a. The first wave generator 31 is mounted inside the portion of the first externally toothed gear 32 where the external teeth 32d are formed.

The boss 32c of the first externally toothed gear 32 is sandwiched between an annular part 72 integrally formed on the inner peripheral part of the inner race 71 of the cross roller bearing 7 and an annular pressing member 9, and in this state, the three members are fastened and fixed together by fastening bolts. In addition, the annular part 72 of the inner race 71 is fastened and fixed to the first output flange 52 of the first output-shaft end part 51 of the output shaft 5 by fastening bolts. In this way, the first externally toothed gear 32 is linked to the first output-shaft end part 51 of the output shaft 5 so as to integrally rotate therewith.

The first internally toothed gear 33 is arranged so as to surround the portion of the first externally toothed gear 32 where the external teeth 32d is formed. The first internally toothed gear 33 has an outer-periphery side portion which is sandwiched between the outer race 73 of the cross roller bearing 7 and the housing 6 and is fastened and fixed to these fixed-side members.

The second strain wave reduction gear 4 is configured similarly. Specifically, a second wave generator 41 is coaxially fixed to the second motor-shaft end part 26a which is a shaft end part of the hollow motor shaft 23 at the side of the second hollow motor shaft part 26. A second wave generator 41 is provided with a rigid second plug 41a coaxially fixed to the end face of the second motor-shaft end part 26a and a wave-generator bearing 41c mounted on the second ellipsoidal outer circumferential surface 41b formed on the outer circumferential surface of the second plug 41a.

A second externally toothed gear 42 having a cup shape is provided with a cylindrical body part 42a, a diaphragm 42b extending radially and inwardly from an end of the cylindrical body at the second side, and external teeth 42d formed on the outer circumferential surface portion of the other end of the cylindrical body part 42a. The second wave generator 41 is mounted inside the portion of the second externally toothed gear 42 where the external teeth 42d are formed.

The boss 42c of the second externally toothed gear 42 is sandwiched between the annular part 82 integrally formed on the inner peripheral part of the inner race 81 of the cross roller bearing 8 and an annular pressing member 11, and these three members in this state are fastened and fixed together by fastening bolts. In addition, the annular part 82 of the inner race 81 is fastened and fixed to the second output flange 54 by fastening bolts, the second output flange being attached to the second output-shaft end part 53 of the output shaft 5. In this way, the second externally toothed gear 42 is linked to the second output-shaft end part 53 of the output shaft 5 so as to rotate integrally therewith.

The second internally toothed gear 43 is arranged so as to surround the portion of the external teeth 42d of the second externally toothed gear 42. The outer-peripheral side portion of the second internally toothed gear 43 is sandwiched between the outer race 83 of the cross roller bearing 8 and the housing 6, and is fastened and fixed to these outer race 83 and the housing 6.

Here, the ellipsoidal shape of the first externally toothed gear 32 that is flexed by the first wave generator 31 in the first strain wave reduction gear 3 is the same as that of the second externally toothed gear 42 that is flexed by the second wave generator 41 in the second strain wave reduction gear 4. In addition, these ellipsoidal shapes are shifted by 90° in phase with each other around the center axis line 1a.

In order to flex the first and second externally toothed gears 32 and 42 in this way, the first and second wave generators 31 and 41 are configured as follows. As schematically illustrated in FIG. 1(B), the first ellipsoidal outer circumferential surface 31b of the first wave generator 31 has the same shape as that of the second ellipsoidal outer circumferential surface 41b of the second wave generator 41. In addition, the first and second plugs 31a and 41a are respectively fixed to the first motor-shaft end part 25a and the second motor-shaft end part 26a of the hollow motor shaft 23 so that a state is formed in which the first and second ellipsoidal outer circumferential surfaces 31b and 41b are shifted by 90° in phase with each other around the center axis line 1a.

In the rotary actuator 1, when the motor 2 is driven to rotate the hollow motor shaft 23, the first and second wave generators 31 and 41 of the first and second strain wave reduction gears 3 and 4 on both sides rotate integrally with the hollow motor shaft 23. The rotation of the first and second wave generators 31 and 41 cause to generate relative rotation between the first externally toothed gear 32 and the first internally toothed gear 33 and between the second externally toothed gear 42 and the second internally toothed gear 43, respectively. Since the first and second internally toothed gears 33 and 43 are the fixed-side members, a reduce-speed rotation having the same rotational number is outputted from the first and second externally toothed gears 32 and 42 and is transmitted to the common output shaft 5. The rotation of the output shaft 5 can be outputted to the not-shown load side from the first output flange 52 or the second output flange 54 of the output shaft.

The first and second wave generators 31 and 41 of the first and second strain wave reduction gears 3 and 4 are attached to the hollow motor shaft 23 in a state in which the first and second ellipsoidal outer circumferential surfaces 31b and 41b are shifted by 90° in phase with each other. Therefore, secondary vibration components, which are included in angle transmission errors occurred in the first and second strain wave reduction gears 3 and 4, occur opposite in phase with each other. Since these angle transmission errors are transmitted to the common output shaft 5 and are synthesized there, the secondary vibration components included in the angle transmission errors are canceled each other out. Accordingly, it is possible to reduce angle transmission errors included in the reduced-speed rotation transmitted to the load side from the output shaft 5.

In addition, the reduced-speed rotation is outputted via the one output shaft from the two strain wave reduction gears, and therefore a large output torque can be obtained and a rotary actuator with high moment capacity and high rigidity can be realized.

Embodiment 2

Figure 2:
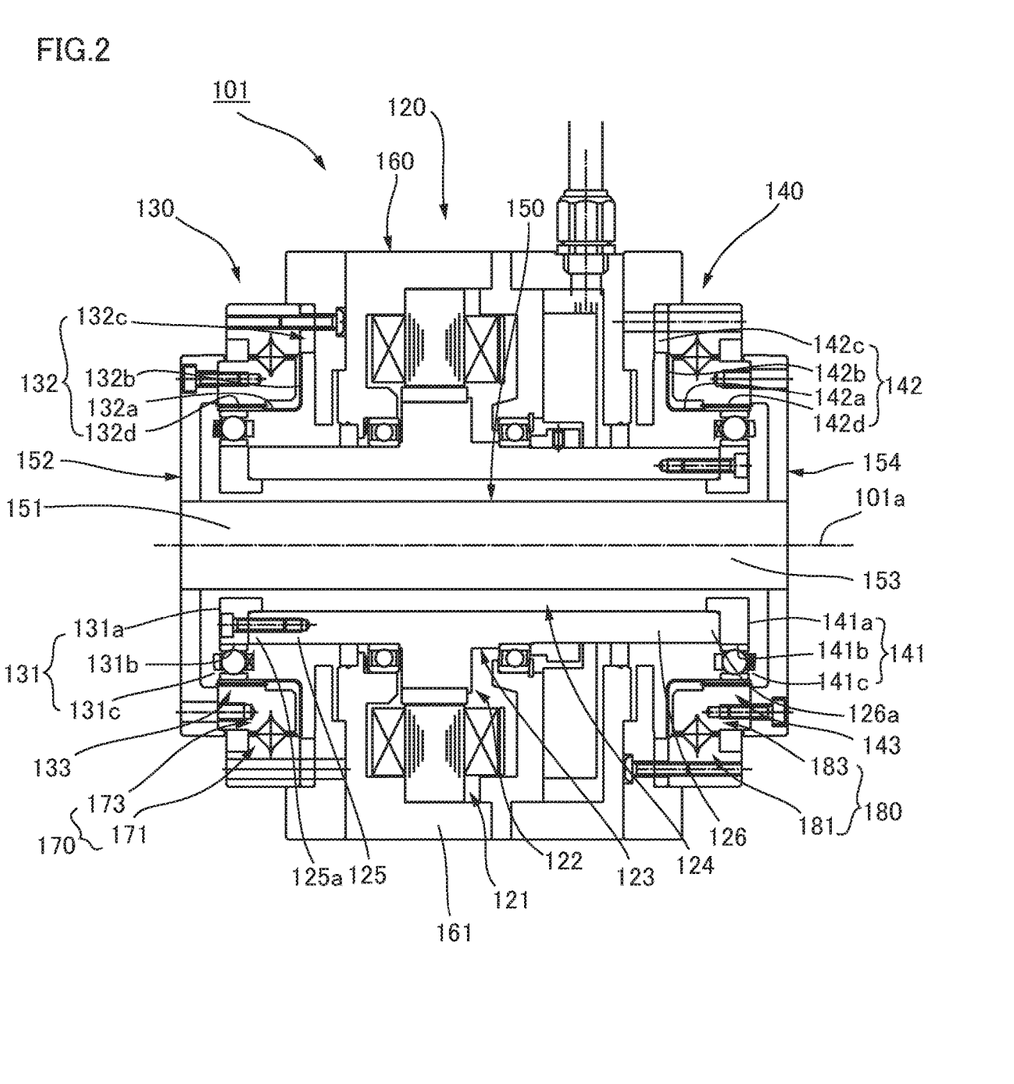
FIG. 2 is a schematic longitudinal cross-sectional view illustrating a rotary actuator according to Embodiment 2 to which the present invention is applied.

FIG. 2 is a schematic longitudinal cross-sectional view illustrating a rotary actuator according to Embodiment 2. The rotary actuator 101 is provided with one hollow-type motor 120, first and second strain wave reduction gears 130 and 140 of silk-hat type, and one output shaft 150. The first and second strain wave reduction gears 130 and 140 are of the same structure having the same reduction ratio and are arranged symmetrically in a state in which the motor 120 is sandwiched therebetween in the direction of the center axis line 101a. The output shaft 150 is a member which takes out a reduced-speed rotation outputted from the first and second strain wave reduction gears 130 and 140 to the load side (not shown).

In the first strain wave reduction gear 130, a flexible first externally toothed gear 132 having a silk-hat shape is flexed into an ellipsoidal shape by a first wave generator 131 and is partially meshed with a rigid first internally toothed gear 133. The first wave generator 131 is a rotation input member into which an output rotation of the motor 120 is inputted, and the first externally toothed gear 132 is a fixed-side member which is fixed to a housing 160 so as not to rotate. The first internally toothed gear 133 is a rotation output member for outputting a reduced-speed rotation to the output shaft 150 and is supported in a free rotatable state via a first bearing which is a cross roller bearing 170 in this example with respect to the first externally toothed gear 132 (the housing 160 to which the first externally toothed gear 132 is fixed).

In the second strain wave reduction gear 140, a flexible second externally toothed gear 142 having a silk-hat shape is flexed into an ellipsoidal shape by a second wave generator 141 and is partially meshed with a rigid second internally toothed gear 143. The second wave generator 151 is a rotation input member into which the output rotation of the motor 2 is inputted, and the second externally toothed gear 142 is a fixed-side member which is fixed to the housing 160 so as not to rotate. A second internally toothed gear 143 is a rotation output member for outputting a reduced-speed rotation to the output shaft 150 and is supported in a free rotatable state via a second bearing which is across roller bearing 180 in this example with respect to the second externally toothed gear 142 (the housing 160 to which the second externally toothed gear 142 is fixed).

The structure of each part will be described. In the following, viewed along the center axis line 101a, the side of the first strain wave reduction gear 130 is referred to as a first side, and the side of the second strain wave reduction gear 140 is as a second side.

The hollow-type motor 120 is provided with a stator 121 attached to the inner periphery of the cylindrical part 161 of the housing 160 and a hollow rotor 122 arranged coaxially inside the stator. The hollow rotor 122 is integrally formed on a hollow motor shaft 123. A motor hollow part 124 is formed in the center part of the hollow motor shaft 123 and extends to pass therethrough in the center axis line 101a. The hollow motor shaft 123 is formed with a first hollow motor-shaft end part 125 extending from the hollow rotor 122 to the first side and a second hollow motor-shaft end part 126 extending from the hollow rotor 122 to the second side.

The output shaft 150 extends to pass through the motor hollow part 124 in a state coaxial with the hollow motor shaft 123. The output shaft 150 has a first output-shaft end part 151 projecting from the motor hollow part 124 to the first side at the side of the first hollow motor shaft part 125, and a large-diameter first output flange 152 is coaxially fixed to the first output-shaft end part 151. The output shaft 150 also has a second output shaft 153 projecting from the motor hollow part 124 to the second side at the side of the second hollow motor shaft part 126. A large-diameter second output flange 154 is attached to the second output-shaft end part 153.

In the first strain wave reduction gear 130, the first wave generator 131 is coaxially fixed to the first motor-shaft end part 125a which is a shaft end part of the first hollow motor shaft part 125 of the hollow motor shaft 123. The first wave generator 131 is provided with a rigid first plug 131a fixed coaxially to the end face of the first motor-shaft end part 125a and a wave-generator bearing 131c mounted on the first ellipsoidal outer circumferential surface 131b formed on the outer circumferential surface of the first plug 131a. The first plug 131a is a hollow plug, and the first output-shaft end part 151 of the output shaft 150 passes through the hollow part of the first plug and projects therefrom to the first side.

The first externally toothed gear 132 having a silk-hat shape is provided with a cylindrical body 132a, a diaphragm 132b extending radially and outwardly from an end of the cylindrical body 132a at the second side, a rigid annular boss 132c formed on the outer peripheral edge of the diaphragm 132b, and external teeth 132d formed on the outer circumferential surface portion on the other end of the cylindrical body. A first wave generator 131 is mounted inside the portion of the first externally toothed gear 132 where the external teeth 132d are formed.

The boss 132c of the first externally toothed gear 132 which is a fixed-side member is sandwiched between the end face of the outer race 171 of a cross roller bearing 170 and the end face of the housing 160. In this state, these three members are fastened and fixed together by fastening bolts.

The first internally toothed gear 133 which is a rotation output member is arranged so as to surround the portion of the external teeth 132d of the first externally toothed gear 132. The first internally toothed gear 133 is integrally formed on the inner periphery part of the inner race 173 of the cross roller bearing 170. A first output flange 152 is coaxially fixed to the end face of the inner race 173 at the first side by fastening bolts.

The second wave generator 141 is coaxially fixed to the second motor-shaft end part 126a which is a shaft end part of the second hollow motor shaft part 126 of the hollow motor shaft 123. The second wave generator 141 is provided with a rigid second plug 141a coaxially fixed to the end face of the second motor-shaft end part 126a, and a wave-generator bearing 141c mounted on the second ellipsoidal outer circumferential surface 141b formed on the outer circumferential surface of the second plug 141a. The second plug is a hollow plug, and the second output-shaft end part 153 of the output shaft 150 passes through the hollow part of the second plug and projects therefrom to the second side.

The second externally toothed gear 142 having a silk-hat shape is provided with a cylindrical body 142a, a diaphragm 142b extending radially and outwardly from an end of the cylindrical body 142a at the first side, a rigid annular boss 142c formed on the outer peripheral edge of the diaphragm 142b, and external teeth 142d formed on the outer circumferential surface portion on the other end of the cylindrical body. The second wave generator 141 is mounted inside the portion of the second externally toothed gear 142 where the external teeth 142d are formed.

The boss 142c of the second externally toothed gear 142 which is a fixed-side member is sandwiched between the end face of the outer race 181 of the cross roller bearing 180 and the end face of the housing 160. In this state, these three members are fastened and fixed by fastening bolts. The second internally toothed gear 143 which is a rotation output member is arranged so as to surround the portion of the external teeth 142d of the second externally toothed gear 142. The second internally toothed gear 143 is integrally formed in the inner periphery part of the inner race 183 of the cross roller bearing 180. A second output flange 154 is coaxially fixed to the end face of the inner race 183 at the second side by fastening bolts.

Here, the ellipsoidal shape of the first externally toothed gear 132 that is flexed by the first wave generator 131 in the first strain wave reduction gear 130 is the same as that of the second externally toothed gear 142 that is flexed by the second wave generator 141 in the second strain wave reduction gear 140. In addition, these ellipsoidal shapes are shifted by 90° in phase with each other around the center axis line 101a.

In this example, the first ellipsoidal outer circumferential surface 131b of the first wave generator 131 has the same shape as the second ellipsoidal outer circumferential surface 141b of the first wave generator 141. In addition, the first and second plug 131a and 141a are respectively fixed to the first motor-shaft end part 125a and the second motor-shaft end part 126a of the hollow motor shaft 123 so that the first and second ellipsoidal outer circumferential surfaces 131b and 141b are shifted by 90° in phase with each other around the center axis line 101a.

In the rotary actuator 101, when the motor 120 is driven to rotate the hollow motor shaft 123, the first and second wave generators 131 and 141 of the first and second strain wave reduction gears 130 and 140 on both sides rotate integrally with the hollow motor shaft 123. The rotation of the first and second wave generators 131 and 141 causes to generate relative rotation between the first externally toothed gear 132 and the first internally toothed gear 133 and between the second externally toothed gear 142 and the second internally toothed gear 143, respectively. Since the first and second externally toothed gears 132 and 142 are the fixed-side members, a reduce-speed rotation having the same rotational number is outputted from the first and second internally toothed gears 133 and 143 and is transmitted to the common output shaft 150. The rotation of the output shaft 150 can be outputted to the not-shown load side from the first output flange 152 or the second output flange 154 of the output shaft.

The first and second wave generators 131 and 141 of the first and second strain wave reduction gears 130 and 140 are attached to the hollow motor shaft 123 in a state in which the first and second ellipsoidal outer circumferential surfaces 131b and 141b are shifted by 90° in phase with each other. Therefore, secondary vibration components, which are included in angle transmission errors occurred in the first and second strain wave reduction gears 130 and 140, occur opposite in phase with each other. Since these angle transmission errors are transmitted to the common output shaft 150 and are synthesized there, the secondary vibration components included in the angle transmission errors are canceled each other out. Accordingly, it is possible to reduce angle transmission errors included in the reduced-speed rotation transmitted to the load side from the output shaft 150.

In addition, the reduced-speed rotation is outputted via the one output shaft from the two strain wave reduction gears, and therefore a large output torque can be obtained and a rotary actuator with high moment capacity and high rigidity can be realized.

Embodiment 3

Figure 3:
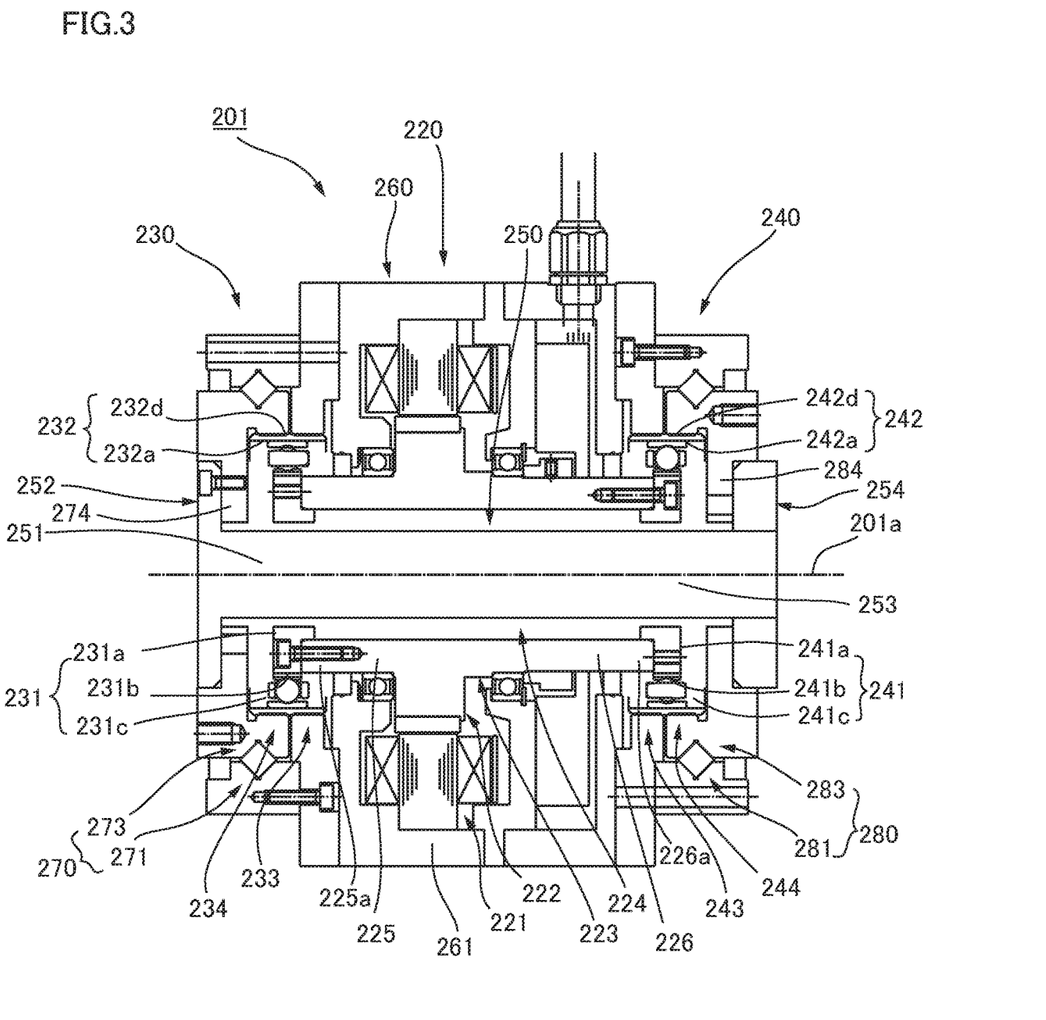
FIG. 3 is a schematic longitudinal cross-sectional view illustrating a rotary actuator according to Embodiment 3 to which the present invention is applied.

FIG. 3 is a schematic longitudinal cross-sectional view illustrating a rotary actuator according to Embodiment 3.

The rotary actuator 201 is provided with one hollow-type motor 220, first and second strain wave reduction gears 230 and 240 of flat type, and one output shaft 250. The first and second strain wave reduction gears 230 and 240 are of the same structure having the same reduction ratio and are arranged symmetrically in a state sandwiching the motor 220 in the direction of the center axis 201a. The output shaft 250 is a member which takes out a reduced-speed rotation outputted from the first and second strain wave reduction gears 230 and 240 to a load side (not shown).

In the first strain wave reduction gear 230, a flexible first externally toothed gear 232 having a cylindrical shape is flexed into an ellipsoidal shape by a first wave generator 231 and is partially meshed with both a rigid first stationary-side internally toothed gear 233 and a rigid first driven-side internally toothed gear 234. The first wave generator 231 is a rotation input member into which rotation of the motor 220 is inputted. The first externally toothed gear 232 is a reduced-speed-rotation output member and has the number of teeth which is different by 2n (n is a positive integer) from the first stationary-side internally toothed gear 233 but is the same as the first driven-side internally toothed gear 234. Accordingly, the first externally toothed gear 232 rotates integrally with the first driven-side internally toothed gear 234. The first stationary-side internally toothed gear 233 is a fixed-side member. The first externally toothed gear 232 and the first driven-side internally toothed gear 234, which rotate integrally, are supported in a free rotatable state, via a first bearing which is a cross roller bearing 270 in this example, with respect to the first stationary-side internally toothed gear 233 (the housing 260 to which the first stationary-side internally toothed gear 233 is fixed).

Similarly, in the second strain wave reduction gear 240, a flexible second externally toothed gear 242 having a cylindrical shape is flexed into an ellipsoidal shape by a second wave generator 241 and is partially meshed with both a rigid second stationary-side internally toothed gear 243 and a rigid second driven-side internally toothed gear 244. The second wave generator 241 is a rotation input member into which a rotation of the motor 220 is inputted. The second externally toothed gear 242 is a reduced-speed-rotation output member and rotates integrally with the second drive-side internally toothed gear 244. The second stationary-side internally toothed gear 243 is a fixed-side member. The second externally toothed gear 242 and the second driven-side internally toothed gear 244, which rotate integrally, are supported in a free rotatable state, via a second bearing which is a cross roller bearing 280 in this example, with respect to the second stationary-side internally toothed gear 243 (the housing 260 to which the second stationary-side internally toothed gear 243 is fixed).

The structure of each part will be described. Viewed along the center axis line 201a, the side of the first strain wave reduction gear 230 is referred to as a first side and the side of the second strain wave reduction gear 240 is as a second side.

The hollow-type motor 220 is provided with a stator 221 attached to the inner periphery of the cylindrical part 261 of the housing 260 and a hollow rotor 222 arranged coaxially inside the stator. The hollow rotor 222 is integrally formed with a hollow motor shaft 223. The center part of the hollow motor shaft 223 is formed with a motor hollow part 224 extending to pass therethrough in the center axis line 201a. The hollow motor shaft 223 is formed with a first hollow motor shaft part 225 extending to the first side from the hollow rotor 222 and a second hollow motor shaft part 226 extending to the second side from the hollow rotor 222.

The output shaft 250 extends to pass through the motor hollow part 224 in a coaxial state with the hollow motor shaft 223. The first output-shaft end part 251 of the output shaft 250 is projected to the first side from the motor hollow part 224 at the side of the first hollow motor shaft part 225, and a large-diameter first output flange 252 is integrally formed on the first output-shaft end part 251. The second output-shaft end part 253 of the output shaft 250 is projected to the second side from the motor hollow part 224 at the side of the second hollow motor shaft part 226. A large-diameter second output shaft 254 is attached to the second output-shaft end part 253.

In the first strain wave reduction gear 230, the first wave generator 231 is coaxially fixed to the first motor-shaft end part 225a which is a shaft end part of the first hollow motor shaft part 225 of the hollow motor shaft 223. The first wave generator 231 is provided with a rigid first plug 231a fixed coaxially to the end face of the first motor-shaft end part 225a and a wave-generator bearing 231c mounted on the first ellipsoidal outer circumferential surface 231b formed on the outer circumferential surface of the first plug 231a. The first plug 231a is a hollow plug, and the first output-shaft end part 251 of the output shaft 250 passes through the hollow part of the first plug and projects therefrom to the first side.

The first externally toothed gear 232 is provided with a cylindrical body 232a and external teeth 232d formed on the outer circumferential surface portion of the cylindrical body 232a. The first wave generator 231 is mounted inside the first externally toothed gear 232.

The first stationary-side internally toothed gear 233 which is a fixed-side member is arranged so as to surround the second-side portion of the first externally toothed gear 232. The first driven-side internally toothed gear 234 is integrally formed on the inner race 273 of the cross roller bearing 270. The inner race 273 is also integrally formed with an annular part 274 extending radially and inwardly, and the annular part 274 is coaxially fixed to the first output flange 252 by fastening bolts.

The first drive-side internally toothed gear 234, which is a rotation output member, is arranged in a state surrounding the portion of the first externally toothed gear on the first side. The first drive-side internally toothed gear 234 is integrally formed on the inner race 273 of the cross roller bearing 270. The inner race 273 is also integrally formed with an annular part 274 extending radially and inwardly, and the annular part 274 is coaxially fixed to the first output flange 252 by fastening bolts.

The second strain wave reduction gear 240 is constituted similarly. Specifically, the second wave generator 241 is coaxially fixed to the second motor-shaft end part 226a which is a shaft end part of the second hollow motor shaft part 226 of the hollow motor shaft 223. The second wave generator 241 is provided with a rigid second plug 241a fixed coaxially to the end face of the second motor-shaft end part 226a and a wave-generator bearing 241c mounted on the second ellipsoidal outer circumferential surface 241b formed on the outer circumferential surface of the second plug 241a. The second plug 241a is a hollow plug, and the second output-shaft end part 253 of the output shaft 250 passes through the hollow part of the second plug and projects therefrom to the second side.

The second externally toothed gear 242 is provided with a cylindrical body 242a and external teeth 242d formed on the outer circumferential surface of the cylindrical body 242a. The second wave generator 241 is mounted inside the second externally toothed gear 242.

The second stationary-side internally toothed gear 243 which is a fixed-side member is arranged so as to surround the first-side portion of the second externally toothed gear 242. The second stationary-side internally toothed gear 244 is sandwiched between the end face of the outer race 281 of the cross roller bearing 280 and the end face of the housing 260, and, in this state, these three members are fastened and fixed together by fastening bolts.

The second driven-side internally toothed gear 244 which is a rotation output member is arranged so as to surround the second-side portion of the second externally toothed gear 242. The second driven-side internally toothed gear 244 is integrally formed on the inner race 283 of the cross roller bearing 280. The inner race 283 is integrally formed with an annular part 284 extending radially and inwardly, and the annular part 284 is coaxially fixed to the second output flange 254 by fastening bolts.

Here, the ellipsoidal shape of the first externally toothed gear 232 that is flexed by the first wave generator 231 in the first strain wave reduction gear 230 is the same as that of the second externally toothed gear 242 that is flexed by the second wave generator 241 in the second strain wave reduction gear 240. In addition, these ellipsoidal shapes are shifted by 90° in phase with each other around the center axis line 201a.

In this example, the first ellipsoidal outer circumferential surface 231b of the first wave generator 231 has the same shape as the second ellipsoidal outer circumferential surface 241b of the second wave generator 241. In addition, the first and second plug 231a and 241a are respectively fixed to the first motor-shaft end part 225a and the second motor-shaft end part 226a of the hollow motor shaft 223 so that the first and second ellipsoidal outer circumferential surfaces 231b and 241b are shifted by 90° in phase with each other around the center axis line 201a.

In the rotary actuator 201, when the motor 220 is driven to rotate the hollow motor shaft 223, the first and second wave generators 231 and 241 of the first and second strain wave reduction gears 230 and 240 on both sides rotate integrally with the hollow motor shaft 223. The rotation of the first and second wave generators 231 and 241 causes to generate relative rotation between the first externally toothed gear 232 (the first drive-side internally toothed gear 234) and the first stationary-side internally toothed gear 233 and between the second externally toothed gear 242 (the second driven-side internally toothed gear 244) and the second stationary-side internally toothed gear 243, respectively. A reduce-speed rotation having the same rotational number is outputted from the first and second driven-side internally toothed gears 234 and 244 and is transmitted to the common output shaft 250. The rotation of the output shaft 250 can be outputted to the not-shown load side from the first output flange 252 or the second output flange 254 on both sides of the output shaft.

The first and second wave generators 231 and 241 of the first and second strain wave reduction gears 230 and 240 are attached to the hollow motor shaft 223 in a state in which the first and second ellipsoidal outer circumferential surfaces 231b and 241b are shifted by 90° in phase with each other. Therefore, secondary vibration components, which are included in angle transmission errors occurred in the first and second strain wave reduction gears 230 and 240, occur opposite in phase with each other. Since these angle transmission errors are transmitted to the common output shaft 250 and are synthesized there, the secondary vibration components included in the angle transmission errors are canceled each other out. Accordingly, it is possible to reduce angle transmission errors included in the reduced-speed rotation transmitted to the load side from the output shaft 250.

In addition, the reduced-speed rotation is outputted via the one output shaft from the two strain wave reduction gears, and therefore a large output torque can be obtained and a rotary actuator with high moment capacity and high rigidity can be realized.

The invention claimed is:

1. A rotary actuator, comprising:
one motor; and
two strain wave reduction gears which decelerate an output rotation of the motor at a same reduction ratio and which output a reduced-speed rotation to a load side from one output shaft,
wherein, in each of the strain wave reduction gears, a flexible externally toothed gear is flexed into an ellipsoidal shape by a wave generator and is partially meshed with a rigid internally toothed gear; the wave generator is a rotation input member to which the output rotation of the motor is inputted; one of the externally toothed gear and the internally toothed gear is a rotation output member from which the reduced-speed rotation is outputted to the output shaft; and the other of the externally toothed gear and the internally toothed gear is a fixed-side member which is fixed not to rotate;
wherein an ellipsoidal shape of the externally toothed gear of the one strain wave reduction gear is offset by 90 degrees in phase from an ellipsoidal shape of the externally toothed gear of the other strain wave reduction gear;
wherein the motor has a hollow motor shaft defining a motor hollow part that extends to pass through the motor in a direction of a center axis line of the motor; and
wherein, where the two strain wave reduction gears are respectively referred to as first and second strain wave reduction gears; the wave generator, the externally toothed gear and the internally toothed gear of the first strain wave reduction gear are referred to as a first wave generator, a first externally toothed gear and a first internally toothed gear; and the wave generator, the externally toothed gear and the internally toothed gear of the second strain wave reduction gear are referred to as a second wave generator, a second externally toothed gear and a second internally toothed gear,
the first strain wave reduction gear is arranged at a first side in the direction of the center axis line with respect to the motor, and the second strain wave reduction gear is arranged at the other second side in the direction of the center axis line symmetrically with respect to the first strain wave reduction gear;
the output shaft extends to pass through the motor hollow part and has a first output-shaft end part projecting from the motor hollow part to the first side and a second output-shaft end part projecting from the motor hollow part to the second side;
the first wave generator is linked coaxially to a first motor-shaft end part of the hollow motor shaft and the second wave generator is linked coaxially to a second motor-shaft end part of the hollow motor shaft;
the rotation output member of the first strain wave reduction gear is linked to the first output-shaft end part so as to integrally rotate therewith; and the rotation output member of the second strain wave reduction gear is linked to the second output-shaft end part so as to integrally rotate therewith.

2. The rotary actuator according to claim 1,
wherein the first wave generator has a rigid first plug coaxially fixed to the first motor-shaft end part and a first wave-generator bearing mounted between a first ellipsoidal outer circumferential surface formed in an outer circumferential surface of the first plug and an inner circumferential surface of the first externally toothed gear;
the second wave generator has a rigid second plug coaxially fixed to the second motor-shaft end part and a second wave-generator bearing mounted between a second ellipsoidal outer circumferential surface formed in an outer circumferential surface of an outer circumferential surface of the second externally toothed gear; and
the first and the second ellipsoidal outer circumferential surfaces are of a same shape, and the first and second plug are fixed to the hollow motor shaft so as to form a state in which the first and second ellipsoidal outer circumferential surfaces are shifted by 90° in phase around the center axis line.

3. The rotary actuator according to claim 2,
wherein the first strain wave reduction gear has a first bearing for supporting the first internally toothed gear and the first externally toothed gear in a relatively rotatable state;
the second strain wave reduction gear has a second bearing for supporting the second internally toothed gear and the second externally toothed gear in a relatively rotatable state; and
the first output-shaft end part is supported by the first bearing and the second output-shaft end part is supported by the second bearing.

4. The rotary actuator according to claim 3,
wherein the first and second plugs are hollow plugs;
a first end plate is fixed to the first output-shaft end part projecting to the first side from the hollow part of the first plug;
where the fixed-side member of the first strain wave reduction gear is referred to as a first fixed-side member; the fixed-side member of the second strain wave reduction gear is referred to as a second fixed-side member; an inner race and an outer race of the first bearing are referred to as a first inner race and a second outer race; and an inner race and an outer race of the second bearing are referred to as a second inner race and a second outer race,
the first end plate is fixed to the first inner race, or the first end plate and the first inner race are formed from a single member;
the first inner race is linked to the first rotation output member so as to rotate integrally, or the first inner race and the first rotation output member are formed from a single member;
a second end plate is fixed to the second output-shaft end part projecting from the hollow part of the second plug to the second side;
the second end plate is fixed to the second inner race, or the second end plate and the second inner race are formed from a single member; and
the second inner race is linked to the second rotation output member so as to rotate integrally, or the second inner race and the second rotation output member are formed from a single member.

5. The rotary actuator according to claim 4,
wherein the first and second strain wave reduction gears are cup-type strain wave reduction gears and are arranged symmetrically in the direction of the center axis line;
the first and second externally toothed gear are respectively the first and second rotation output members; and
the first and second internally toothed gears are respectively the first and second fixed-side members.

6. The rotary actuator according to claim 4,
wherein the first and second strain wave reduction gears are silk-hat-type strain wave reduction gears and are arranged symmetrically in the direction of the center axis line;
the first and second externally toothed gear are respectively the first and second fixed-side members; and
the first and second internally toothed gears are respectively the first and second rotation output members.

7. The rotary actuator according to claim 4,
wherein the first and second strain wave reduction gears are flat-type strain wave reduction gears provided with the first and second externally toothed gear having a cylindrical shape, the flat-type strain wave reduction gears being arranged symmetrically in the direction of the center axis line.

* * * * *